(12) United States Patent
Matsumura

(10) Patent No.: US 9,886,659 B2
(45) Date of Patent: Feb. 6, 2018

(54) RFID TAG

(71) Applicant: FUJITSU LIMITED, Kawasaki-shi, Kanagawa (JP)

(72) Inventor: Takayoshi Matsumura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/268,929

(22) Filed: Sep. 19, 2016

(65) Prior Publication Data

US 2017/0109623 A1  Apr. 20, 2017

(30) Foreign Application Priority Data

Oct. 15, 2015  (JP) .................................. 2015-204055

(51) Int. Cl.
G06K 19/077 (2006.01)

(52) U.S. Cl.
CPC . G06K 19/07745 (2013.01); G06K 19/07773 (2013.01)

(58) Field of Classification Search
USPC ................................................ 235/492, 488
See application file for complete search history.

(56) References Cited

U.S. PATENT DOCUMENTS

| 2004/0156176 | A1 | 8/2004 | Okamoto et al. | |
| 2010/0079290 | A1* | 4/2010 | Phaneuf | G06K 19/07749 340/572.8 |
| 2011/0266351 | A1* | 11/2011 | Wagner | G06K 19/07722 235/488 |
| 2012/0068827 | A1* | 3/2012 | Yi | G01D 5/18 340/10.1 |
| 2012/0248198 | A1* | 10/2012 | Baba | G06K 19/07728 235/488 |
| 2012/0273577 | A1* | 11/2012 | Kim | G06K 19/07722 235/488 |

FOREIGN PATENT DOCUMENTS

| EP | 1 136 945 A1 | 9/2001 |
| EP | 2 058 752 A1 | 5/2009 |
| EP | 2 506 192 A2 | 10/2012 |
| JP | 2009-277255 | 11/2009 |
| WO | WO 00/33249 | 6/2000 |

OTHER PUBLICATIONS

Extended European Search Report dated Mar. 20, 2017, in corresponding European Patent Application No. 16190094.9.

* cited by examiner

*Primary Examiner* — Allyson Trail
(74) *Attorney, Agent, or Firm* — Staas & Halsey LLP

(57) ABSTRACT

An RFID tag includes a substrate; a chip that is joined to the substrate; antenna wiring that is formed above the substrate and is electrically coupled with the chip; and a protector that is provided to the substrate and protects the chip by covering the chip, wherein a length l of the protector satisfies l≤lmax, the lmax being expressed by the following expression: $l_{max} = \sqrt{4\sigma_{by}/3ph}$ where $\sigma_{by}$ represents a bending strength of a material of the protector, h represents a thickness of the protector, and p represents a uniformly distributed load that is received by the protector under a usage environment.

19 Claims, 13 Drawing Sheets

RFID TAG

CROSS-REFERENCE TO RELATED APPLICATION

This application is based upon and claims the benefit of priority of the prior Japanese Patent Application No. 2015-204055, filed on Oct. 15, 2015, the entire contents of which are incorporated herein by reference.

FIELD

The embodiments discussed herein are related to a radio frequency identification (RFID) tag.

BACKGROUND

A method has been known in which an electronic circuit chip is mounted on a flexible sheet (for example, refer to International Publication Pamphlet No. WO 00/33249 and Japanese Laid-open Patent Publication No. 2009-277255).

SUMMARY

According to an aspect of the invention, an RFID tag includes a substrate; a chip that is joined to the substrate; antenna wiring that is formed above the substrate and is electrically coupled with the chip; and a protector that is provided to the substrate and protects the chip by covering the chip, wherein a length l of the protector satisfies l≤lmax, the lmax being expressed by the following expression: $l_{max} = \sqrt{4\sigma_{by}/3ph}$ where $\sigma_{by}$ represents a bending strength of a material of the protector, h represents a thickness of the protector, and p represents a uniformly distributed load that is received by the protector under a usage environment.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

An RFID tag in related art includes a protector that covers and protects an integrated circuit (IC) chip. However, there has been a problem that the protector bends due to plastic deformation under a usage environment and a protection function of the protector that protects the IC chip is apt to be impaired.

It is desirable to provide an RFID tag in which a protector is less likely to bend due to plastic deformation under a usage environment.

Embodiments will hereinafter be described in detail with reference to drawings.

First Embodiment

Figure 1:
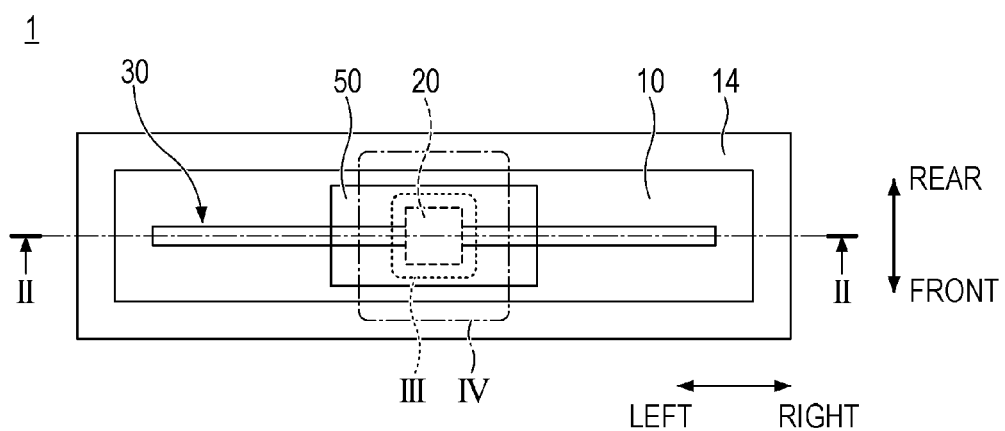
FIG. 1 is a top view that schematically illustrates an RFID tag according to a first embodiment.
Figure 2:
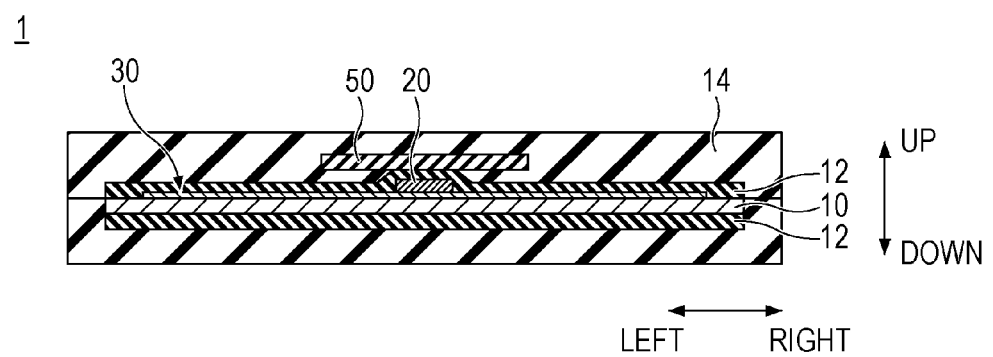
FIG. 2 is a schematic cross-sectional view taken along line II-II of FIG. 1.
Figure 3:
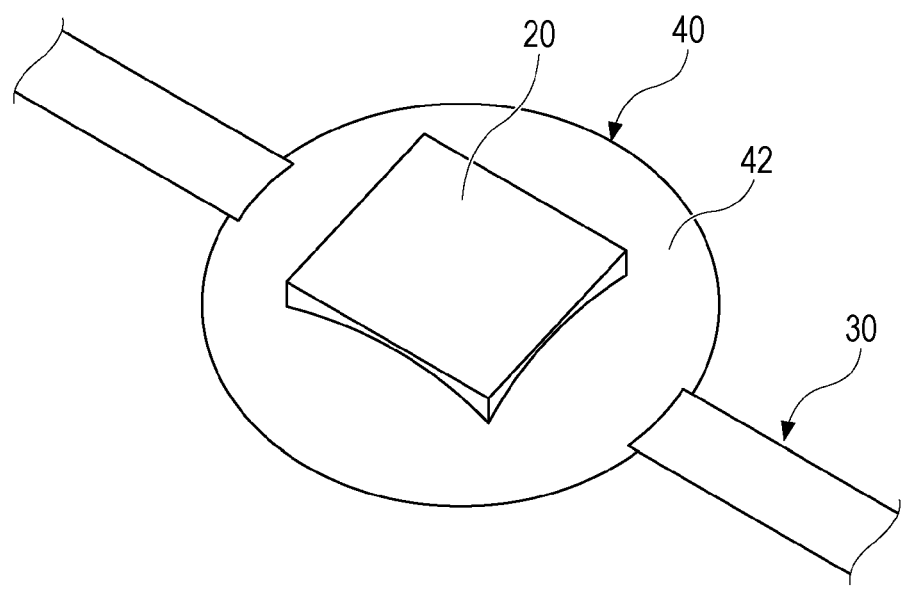
FIG. 3 is an enlarged perspective view of section III of FIG. 1.

FIG. 1 is a top view that schematically illustrates an RFID tag according to a first embodiment. FIG. 2 is a schematic cross-sectional view taken along line II-II of FIG. 1. FIG. 3 is an enlarged perspective view of section III of FIG. 1. FIG. 1 illustrates an RFID tag 1 by a transparent view so that internal portions may be seen. FIG. 3 does not illustrate a protector 50, protection layers 12, and an exterior portion 14.

In the description below, as illustrated in FIG. 1, as for the horizontal direction (the left-right direction), the description will be made while the direction of the long sides of a substrate 10 or the longitudinal direction of the substrate 10 is defined as the horizontal direction or the left-right direction. Further, the description will be made while the direction of the short sides of the substrate 10 (widthwise direction) is defined as the front-rear direction. Further, as illustrated in FIG. 2, as for the up-down direction, the description will be made while the side on which an IC chip 20 is provided with respect to the substrate 10 is defined as an upper side. However, installation of the RFID tag 1 may be made in any orientation.

The RFID tag 1 may be used for management of articles, for example. Any article may be articles as management targets. Examples may include uniforms used by workers of accommodation facilities and amusement facilities and sheets, pillowcases, and so forth used in accommodation facilities.

The RFID tag 1 includes the substrate 10, the IC chip 20, antenna wiring 30, an adhesive layer 40, and the protector 50. Note that FIGS. 1 and 2 do not illustrate the adhesive layer 40.

The substrate 10 is a substrate material for the antenna wiring 30 and is a flexible substrate. The substrate 10 may be formed of polyethylene terephthalate (PET) or polyethylene naphthalate (PEN), for example. As illustrated in FIG. 2, upper and lower surfaces of the substrate 10 are covered by the protection layers 12 in a state where the IC chip 20 and the antenna wiring 30 are implemented, and the substrate 10 is further protected by the protector 50 and the exterior portion 14. The protection layer 12 is formed by lamination, for example. The exterior portion 14 is formed of a flexible material such as rubber, for example.

The IC chip 20 is joined to the substrate 10 by an adhesive. That is, the IC chip 20 is joined to the substrate 10 via the adhesive layer 40 (not illustrated in FIG. 2 and see FIG. 3). The IC chip 20 operates with electromagnetic waves that are received by the antenna wiring 30. The IC chip 20 is provided with specific identification (ID) information, and the ID information is used for management and so forth of the articles.

The antenna wiring 30 is formed in a form of forming a dipole antenna, for example. The antenna wiring 30 is electrically coupled with the IC chip 20. The antenna wiring 30 is formed as a conductor pattern on a surface (upper surface) of the substrate 10.

As described above, the adhesive layer 40 is formed by the adhesive that joins the IC chip 20 to the substrate 10. An anisotropic conductive paste (ACP) or the like, although optionally, may be used as the adhesive, for example. The adhesive layer 40 is formed on the surface (upper surface) of the substrate 10. Further, the adhesive layer 40 is formed on or above the antenna wiring 30 in a presence region of the antenna wiring 30 on the surface of the substrate 10.

As illustrated in FIG. 3, the adhesive layer 40 may include a fillet portion 42. The fillet portion 42 may be formed by adjusting the amount of the adhesive to be coated onto the substrate 10. An outer peripheral edge of the fillet portion 42 will hereinafter be referred to as "fillet edge".

The protector 50 includes a function of protecting the IC chip 20 by covering the whole IC chip 20. The protector 50 may be formed of PET, polyphenylene sulfide (PPS), polypropylene (PP), PEN, and so forth, for example. The protector 50 may be in a form of a plastic film with a thickness of 150 to 300 µm, for example. The shape and so forth of the protector 50 will be described later.

The protector 50 may directly cover the IC chip 20 or may cover the IC chip 20 via the protection layer 12 as illustrated in FIG. 2. In the example illustrated in FIG. 2, the protector 50 is attached onto the protection layer 12 by an adhesive (not illustrated), for example.

Next, a configuration of the protector 50 will be described with reference to FIGS. 4 to 6.

Figure 4:
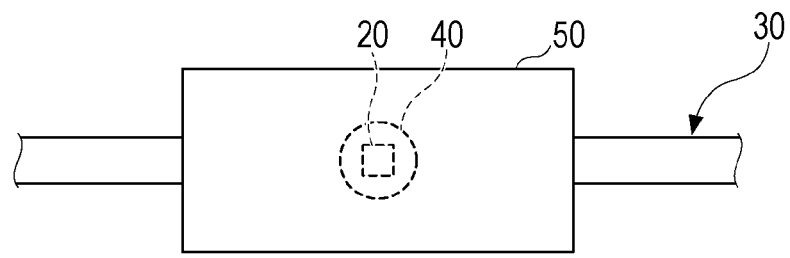
FIG. 4 is an enlarged top view of section IV of FIG. 1.

FIG. 4 is an enlarged top view of section IV of FIG. 1. In FIG. 3, the protection layers 12 and the exterior portion 14 are not illustrated.

In the first embodiment, the protector 50 has a form of a rectangle which is long in the left-right direction. The protector 50 has an outer shape significantly larger than the outer shape of the IC chip 20. In the example illustrated in FIG. 4, the protector 50 covers the IC chip 20 and the whole adhesive layer 40.

Figure 5:
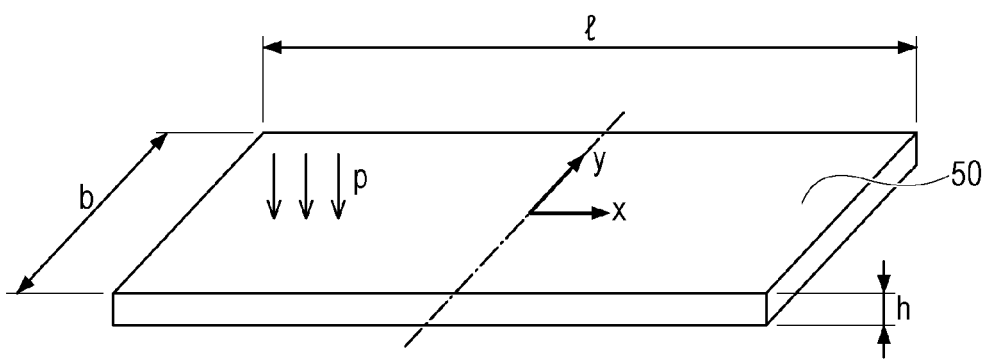
FIG. 5 is a perspective view that illustrates a model in a state where a uniformly distributed load is applied to a protector.
Figure 6:
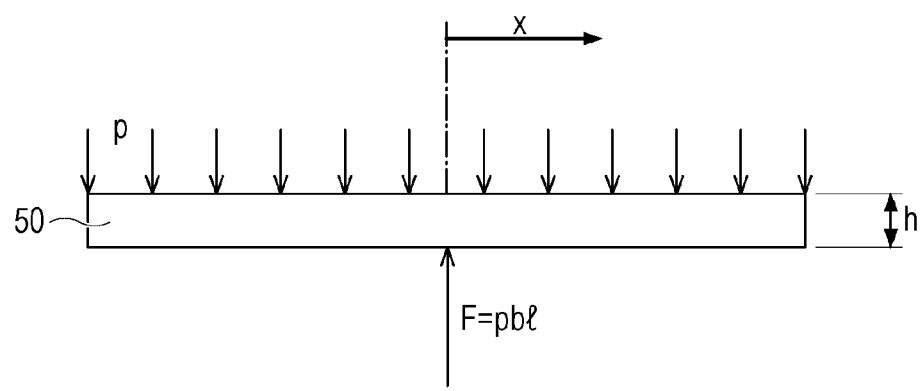
FIG. 6 is a side view that illustrates the model in a state where a uniformly distributed load is applied to the protector.

FIG. 5 is an explanatory diagram of preferable dimensions of the protector 50 and is a perspective view that schematically illustrates the protector 50 alone. FIG. 6 is a side view that schematically illustrates the protector 50 alone in a state where a uniformly distributed load is applied thereto. As illustrated in FIG. 6, in the state illustrated in FIG. 5 where the uniformly distributed load is applied, an upward load (reaction force) F is applied to the center of the protector 50 and balances with a uniformly distributed load p. That is, the center of the protector 50 becomes a fulcrum.

Here, as illustrated in FIG. 5, the center of x-y coordinates is set to the center of the protector 50. An x direction corresponds to the left-right direction, and the positive direction of the x direction corresponds to the right direction. Further, a y direction corresponds to the front-rear direction, and the positive direction of the y direction corresponds to the rear direction as illustrated in FIG. 5. Here, as illustrated in FIG. 5, the protector 50 has a size of b×l×h (l>b), receives the uniformly distributed load of a pressure p. A discussion will be made about the bending stress that is applied to the one-dot chain line (the line of x=0) which is perpendicular to the dimension l. The dimension b is the width in the front-rear direction, the dimension l is the length (the length in the left-right direction), and the dimension h is the thickness.

In the example illustrated in FIG. 5, the bending moment becomes the maximum in a central portion of the dimension l (the line of x=0), and the stress also becomes the maximum in the central portion. Here, given that M is set as the bending moment and Z is set as the section modulus of the protector 50, a generated stress $\sigma(\sigma=M/Z)$ is obtained as follows. Because the bending moment in the range of the infinitesimal width dx is $\Delta M = \frac{1}{8} \cdot p l^2 \Delta y$, the bending moment applied to a central cross section (the cross section along the line of x=0) of the protector 50 is given by the following expression (1).

$$M = \int_0^{\frac{l}{2}} pbx\,dx = \frac{1}{8} pbl^2 \qquad (1)$$

The section modulus Z is obtained by the following expression (2).

$$Z = \frac{bh^2}{6} \qquad (2)$$

Based on those two expressions, the stress σ is obtained by the following expression (3).

$$\sigma = \frac{M}{Z} = \frac{3pl^2}{4h^2} \qquad (3)$$

When the stress σ applied to the central portion of the protector 50 is less than the bending strength $\sigma_{by}$ of a material, the protector 50 does not plastically bend. That is, in a case where the size of the protector 50 is decided so that the following relational expression (4) holds true, the protector 50 does not plastically bend due to plastic deformation under the environment in which the protector 50 receives the uniformly distributed load of the pressure p.

$$\sigma = \frac{3pl^2}{4h^2} \leq \sigma_{by} \quad (4)$$

The bending strength $\sigma_{by}$ is a value that is decided in accordance with a material. For example, the bending strength $\sigma_{by}$ may be selected from a range of 96 to 131 MPa in a case where the material of the protector 50 is PET, may be 142 MPa in a case where the material of the protector 50 is PPS, and may be selected from a range of 41 to 55 MPa in a case where the material of the protector 50 is PP. Expression 4 may be modified as following expression (5). It may be understood from Expression 5 that the protector 50 does not bend due to plastic deformation under the environment in which the protector 50 receives the uniformly distributed load of the pressure p in a case where the length l satisfies the following relational expression.

$$l \leq \sqrt{\frac{4\sigma_{by}}{3p}} h \quad (5)$$

As it may be understood from Expression 3, the stress 6 is not influenced by the width b of the protector 50.

Accordingly, in the first embodiment, the protector 50 is formed so as to have characteristics that satisfy the relationship of Expression 4 or Expression 5 by using a value (for example, the maximum value, an average value, or the like) of the uniformly distributed load that is received by the RFID tag 1 under the usage environment as the uniformly distributed load p. The maximum length l that satisfies Expression 5 will hereinafter be referred to as "permissible maximum length lmax".

Here, the value of the uniformly distributed load that is received by the RFID tag 1 under the usage environment is different in accordance with the usage environment of the RFID tag 1. In the first embodiment, the value of the uniformly distributed load that is received by the RFID tag 1 under the usage environment is 40 to 70 bar ($40 \times 10^5$ to $70 \times 10^5$ Pa) and more preferably 50 to 60 bar ($50 \times 10^5$ to $60 \times 10^5$ Pa). Such a value corresponds to the value of a pressure that is received by the RFID tag 1 in a case where the RFID tag 1 is used for clothing, bedclothing, and so forth which contact with skin of a person and in a dewatering step and so forth in a large laundry facility. More specifically, the articles such as uniforms, sheets, and pillowcases undergo all steps of washing, dewatering, ironing, and folding in a large laundry facility. Accordingly, in a case where the RFID tag 1 is used for management of such an article, the RFID tag 1 undergoes the process of the same washing steps in a laundry facility together with the article. In those washing steps, particularly in the dewatering step (for example, pressure dewatering) and the ironing step (for example, ironing by a large roll ironing machine), a high pressure is applied, and this is a severe usage environment for the RFID tag 1.

In this point, as described above, the protector 50 according to the first embodiment has the characteristics that satisfy the relationship of Expression 4 or Expression 5. Accordingly, the first embodiment may provide the RFID tag 1 in which the protector 50 is less likely to bend due to plastic deformation under the usage environment. Consequently, a protection function (the protection function for the IC chip 20) of the protector 50 may be maintained under the usage environment. As a result, in the first embodiment, the RFID tag 1 may maintain high durability even under the above-described severe usage environment.

Further, in the first embodiment, the RFID tag 1 has flexibility because the substrate 10, the protection layers 12, and the exterior portion 14 have flexibility. Such a flexible RFID tag 1 may preferably be used for clothing, bedclothing, and so forth that contact with skin of a person. This is because the RFID tag 1 has flexibility and thus reduces the possibility that the RFID tag 1 causes uncomfortableness to a person who wears clothing and so forth. Further, the RFID tag 1 attached to clothing, bedclothing, or the like deforms due to an external load in the washing steps as described below, and the flexibility of the RFID tag 1 is thus requested in this point also.

In the first embodiment, the protector 50 is provided in the orientation in which the longitudinal direction of the protector 50 corresponds to the longitudinal direction of the substrate 10. However, the protector 50 may be provided to the substrate 10 in another orientation.

Second Embodiment

An RFID tag according to a second embodiment is different from the RFID tag 1 according to the first embodiment in a point that the protector 50 is substituted by a protector 50A. The other configurations may be the same, and descriptions thereof will not be made.

Figure 7:
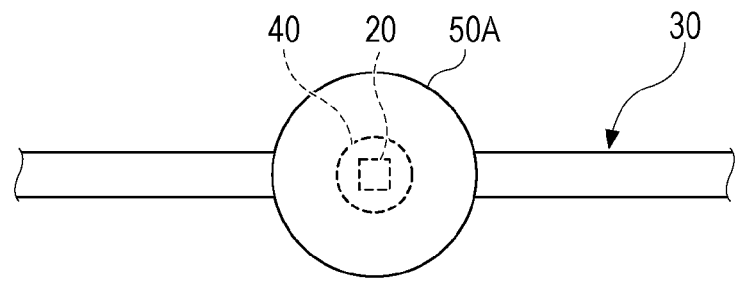
FIG. 7 is a top view that schematically illustrates a protector according to a second embodiment.

FIG. 7 is a top view that schematically illustrates the protector 50A according to the second embodiment and is a view that corresponds to section IV of FIG. 1.

As illustrated in FIG. 7, the protector 50A has a difference only in the shape from the protector 50 according to the first embodiment. Specifically, the protector 50A has a circular form. The protector 50A has an outer shape significantly larger than the outer shape of the IC chip 20. In the example illustrated in FIG. 7, the protector 50A covers the IC chip 20 and the whole adhesive layer 40.

Figure 8:
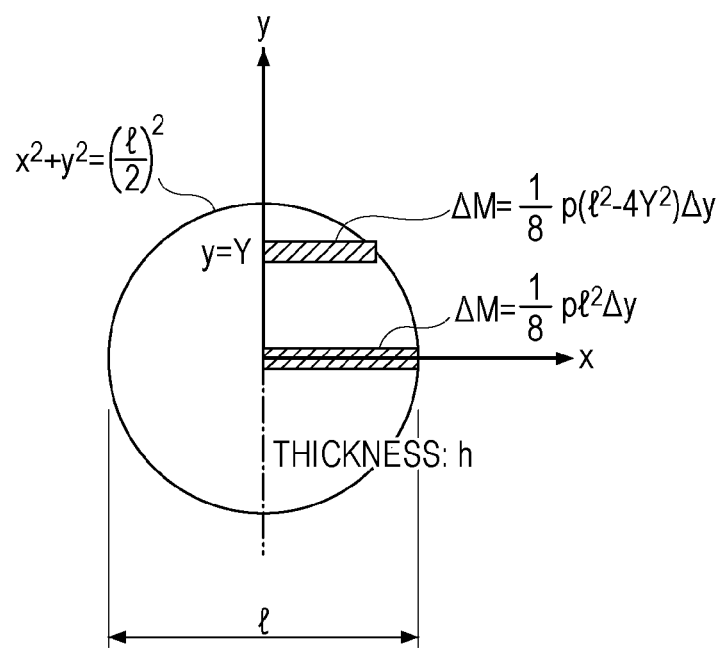
FIG. 8 is a top view that illustrates a model in a state where a uniformly distributed load is applied to the protector according to the second embodiment.

FIG. 8 is an explanatory view of the moment applied to the circular protector 50A and is a top view of the protector 50A. As illustrated in FIG. 8, a moment $\Delta M$ generated for the infinitesimal width $\Delta y$ in the y direction is obtained by the following expression (6).

$$\Delta M = \frac{1}{8} p(l^2 - 4Y^2) \Delta y \quad (6)$$

Accordingly, the maximum stress is generated on the cross section that passes through the center of the circular shape, and the value is similar to the case of the first embodiment. Accordingly, similarly to the protector 50 according to the first embodiment, the protector 50A is formed so as to have characteristics that satisfy the relationship of Expression 4 or Expression 5 by using the value of the uniformly distributed load that is received by the RFID tag which includes the protector 50A under the usage environment as the uniformly distributed load p. The length l of the protector 50A is also the length in the x direction (the length of the diameter).

The second embodiment may provide similar effects to the first embodiment.

Third Embodiment

An RFID tag according to a third embodiment is different from the RFID tag 1 according to the first embodiment in a point that the protector 50 is substituted by a protector 50B. The other configurations may be the same, and descriptions thereof will not be made.

Figure 9:
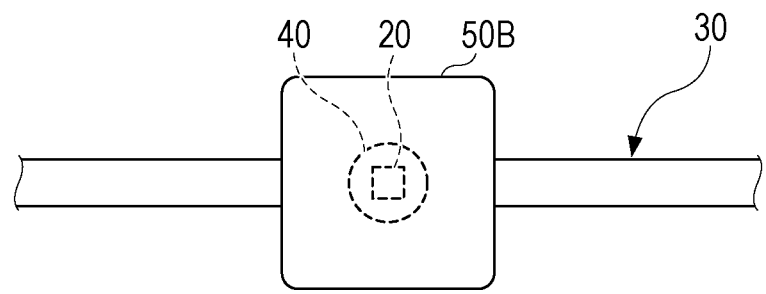
FIG. 9 is a top view that schematically illustrates a protector according to a third embodiment.

FIG. 9 is a top view that schematically illustrates the protector 50B according to the third embodiment and is a view that corresponds to section IV of FIG. 1.

As illustrated in FIG. 9, the protector 50B has a difference only in the shape from the protector 50 according to the first embodiment. Specifically, the protector 50B has a square form. The protector 50B has an outer shape significantly larger than the outer shape of the IC chip 20. In the example illustrated in FIG. 9, the protector 50B covers the IC chip 20 and the whole adhesive layer 40.

Figure 10:
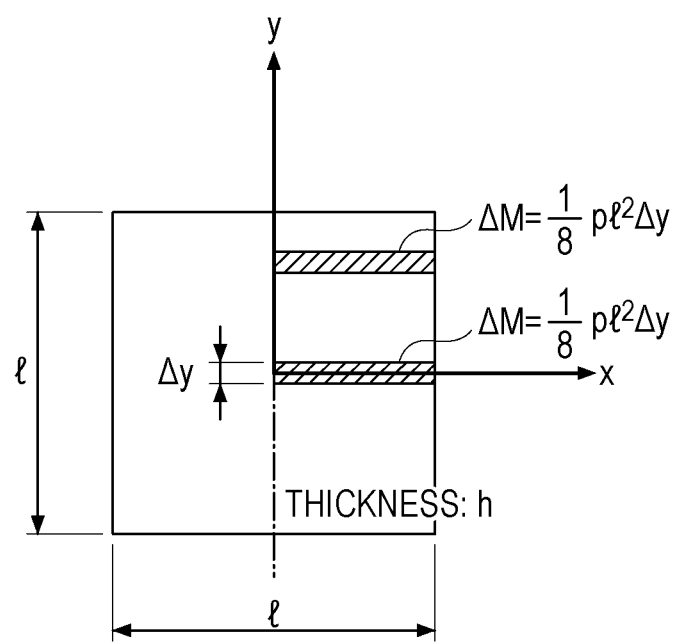
FIG. 10 is a top view that illustrates a model in a state where a uniformly distributed load is applied to the protector according to the third embodiment.

FIG. 10 is an explanatory view of the moment applied to the square protector 50B and is a top view of the protector 50B. As illustrated in FIG. 10, a moment $\Delta M$ generated for the infinitesimal width $\Delta y$ in the y direction is obtained by the following expression (7).

$$\Delta M = \tfrac{1}{8} p l^2 \Delta y \tag{7}$$

Accordingly, the maximum stress is generated on the cross section along the line of the y=0 (or x=0), and the value is similar to the case of the first embodiment. Accordingly, similarly to the protector 50 according to the first embodiment, the protector 50B is formed so as to have characteristics that satisfy the relationship of Expression 4 or Expression 5 by using the value of the uniformly distributed load that is received by the RFID tag which includes the protector 50B under the usage environment as the uniformly distributed load p. The length l of the protector 50B is also the length in the x direction.

The third embodiment may provide similar effects to the first embodiment.

Fourth Embodiment

An RFID tag according to a fourth embodiment is different from the RFID tag 1 according to the first embodiment in a point that the protector 50 is substituted by a protector 50C. The other configurations may be the same, and descriptions thereof will not be made.

Figure 11:
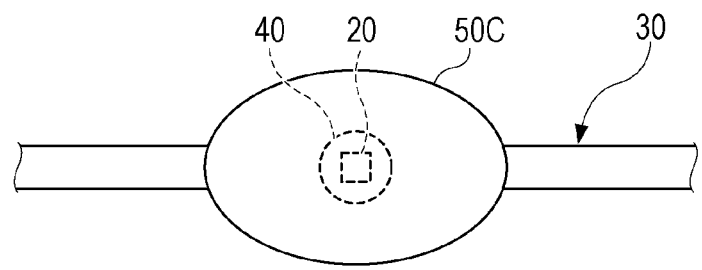
FIG. 11 is a top view that schematically illustrates a protector according to a fourth embodiment.

FIG. 11 is a top view that schematically illustrates the protector 50C according to the fourth embodiment and is a view that corresponds to section IV of FIG. 1.

As illustrated in FIG. 11, the protector 50C has a difference only in the shape from the protector 50 according to the first embodiment. Specifically, the protector 50C has an elliptical form. The protector 50C has an outer shape significantly larger than the outer shape of the IC chip 20. In the example illustrated in FIG. 11, the protector 50C covers the IC chip 20 and the whole adhesive layer 40.

Figure 12:
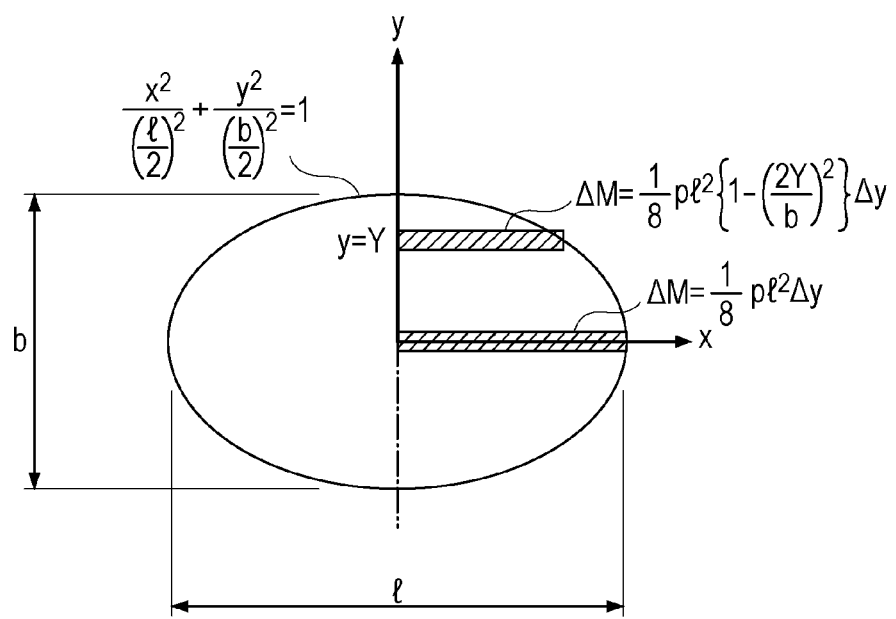
FIG. 12 is a top view that illustrates a model in a state where a uniformly distributed load is applied to the protector according to the fourth embodiment.

FIG. 12 is an explanatory view of the moment applied to the elliptical protector 50C and is a top view of the protector 50C. As illustrated in FIG. 12, a moment $\Delta M$ generated for the infinitesimal width $\Delta y$ in the y direction is as follows:

$$\Delta M = \frac{1}{8} p l^2 \left\{ 1 - \left( \frac{2Y}{b} \right)^2 \right\} \Delta y \tag{8}$$

Accordingly, the maximum stress is generated in the portion that corresponds to y=0, and the value is similar to the case of the first embodiment. Accordingly, similarly to the protector 50 according to the first embodiment, the protector 50C is formed so as to have characteristics that satisfy the relationship of Expression 4 or Expression 5 by using the value of the uniformly distributed load that is received by the RFID tag which includes the protector 50C under the usage environment as the uniformly distributed load p. The length l of the protector 50C is also the length in the major axis direction (the x direction).

The fourth embodiment may provide similar effects to the first embodiment.

In the fourth embodiment, the protector 50C is provided in the orientation in which the major axis direction of the protector 50C corresponds to the longitudinal direction of the substrate 10. However, the protector 50C may be provided to the substrate 10 in another orientation.

Fifth Embodiment

An RFID tag according to a fifth embodiment is different from the RFID tag 1 according to the first embodiment in a point that the protector 50 is substituted by a protector 50D and the IC chip 20 is substituted by an IC chip 20D. The other configurations may be the same, and descriptions thereof will not be made.

Figure 13:
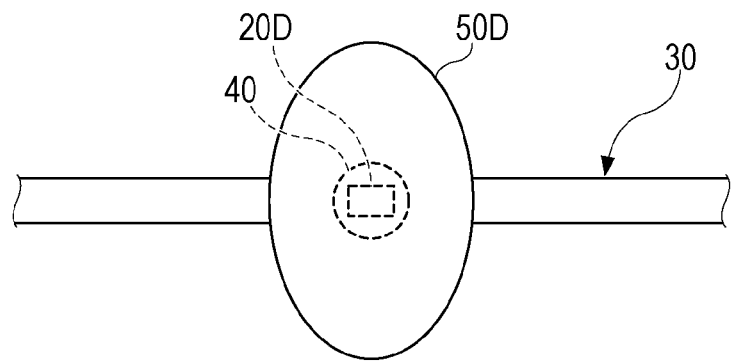
FIG. 13 is a top view that schematically illustrates a protector according to a fifth embodiment.

FIG. 13 is a top view that schematically illustrates the IC chip 20D and the protector 50D according to the fifth embodiment and is a view that corresponds to section IV of FIG. 1.

As illustrated in FIG. 13, the IC chip 20D has a difference only in the shape from the IC chip 20 according to the first embodiment. Specifically, the IC chip 20D has a rectangular form. The IC chip 20D is arranged in the orientation in which the longitudinal direction of the IC chip 20D corresponds to the left-right direction. However, the IC chip 20D may be arranged in any orientation.

As illustrated in FIG. 13, the protector 50D has a difference only in the shape from the protector 50 according to the first embodiment. Specifically, the protector 50D has an elliptical form. The protector 50D is provided in the orientation in which the minor axis direction of the protector 50D corresponds to the longitudinal direction of the IC chip 20D. The protector 50D has an outer shape significantly larger than the outer shape of the IC chip 20D. In the example illustrated in FIG. 13, the protector 50D covers the IC chip 20D and the whole adhesive layer 40.

Figure 14:
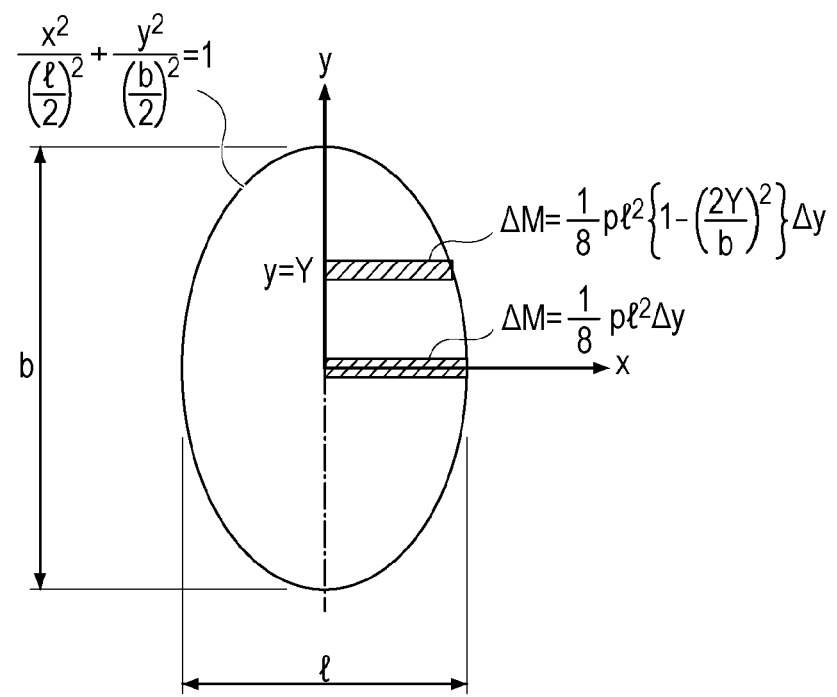
FIG. 14 is a top view that illustrates a model in a state where a uniformly distributed load is applied to the protector according to the fifth embodiment.

FIG. 14 is an explanatory view of the moment applied to the elliptical protector 50D and is a top view of the protector 50D. As illustrated in FIG. 14, a moment $\Delta M$ generated for the infinitesimal width $\Delta y$ in the y direction is the same as above Expression 8. Accordingly, the maximum value of the value of a stress to bend the protector 50D along the y axis is similar to the case of the first embodiment. Accordingly, similarly to the protector 50 according to the first embodiment, the protector 50D is formed so as to have characteristics that satisfy the relationship of Expression 4 or Expression 5 by using the value of the uniformly distributed load that is received by the RFID tag which includes the protector 50D under the usage environment as the uniformly distributed load p. The length l of the protector 50D is the length in the minor axis direction (the x direction).

The fifth embodiment may provide similar effects to the first embodiment.

Figure 15:
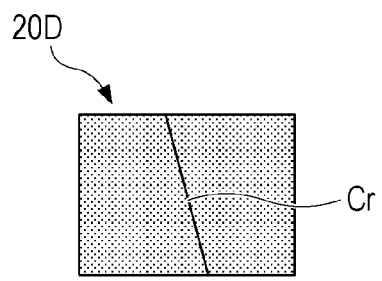
FIG. 15 is an explanatory view of a crack.

Incidentally, in general, a crack Cr is apt to occur to the IC chip 20D in the widthwise direction as schematically illustrated in FIG. 15. In this point, as described above, in the fifth embodiment, the protector 50D is provided in the orientation in which the minor axis direction of the protector 50D corresponds to the longitudinal direction of the IC chip 20D. Accordingly, in the fifth embodiment, bend due to plastic deformation of the protector 50D along the widthwise direction of the IC chip 20 is restrained, the bending stress of the IC chip 20D along the widthwise direction is thus reduced, and occurrence of the crack of the IC chip 20D in the widthwise direction may thus be suppressed.

In the fifth embodiment, the protector 50D has the elliptical form but may have a rectangular form. In such a case, based on the same concept, the protector 50D is provided in the orientation in which the widthwise direction of the protector 50D corresponds to the longitudinal direction of the IC chip 20D. Accordingly, occurrence of the crack of the IC chip 20D in the widthwise direction may similarly be suppressed as described above.

Sixth Embodiment

An RFID tag 1E according to a sixth embodiment is different from the RFID tag 1 according to the first embodiment in a point that the protector 50 is substituted by a protector 50E and a lower protector 51 is added. The other configurations may be the same, and descriptions thereof will not be made.

Figure 16:
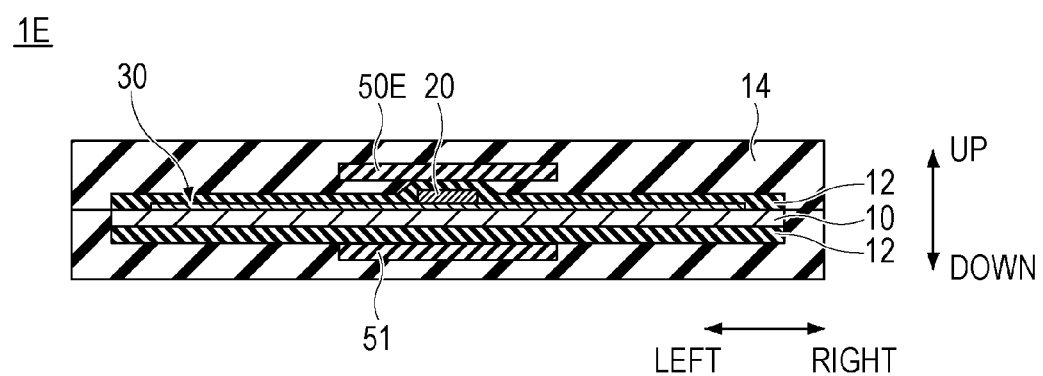
FIG. 16 is a schematic cross-sectional view of an RFID tag according to a sixth embodiment.

FIG. 16 is a schematic cross-sectional view of the RFID tag 1E.

As illustrated in FIG. 16, the lower protector 51 is provided in a form in which the lower protector 51 and a protector 50E cooperatively place the IC chip 20 therebetween in the up-down direction. The lower protector 51 may have the same dimensions (size) and be formed of the same materials as the protector 50E. That is, the lower protector 51 alone may be the same as the protector 50E. The lower protector 51 is arranged in the orientation and position in which the lower protector 51 overlaps with the protector 50E when seen in the up-down direction.

The protector 50E is different in a condition of the dimension (a condition of the length l) from the protector 50 according to the first embodiment. Specifically, the protector 50E is different from the protector 50 according to the first embodiment that satisfies the relational expression indicated by Expression 5 in a point that the length l satisfies the following relational expression (9).

$$l \le \sqrt{\frac{8\sigma_{by}}{3p}} h \quad (9)$$

As illustrated in FIG. 16, the difference between the expressions (5) and (9) is because in a case where the lower protector 51 is provided in addition to the protector 50E, the bending stress (see Expression 3) applied to the protector 50E decreases by the increase in the section modulus by the lower protector 51. Specifically, in a case where the section modulus of the lower protector 51 is the same as the section modulus of the protector 50E, the stress (see Expression 3) is reduced by half. Thus, as indicated by Expression 9, the possible maximum value of the length l of the protector 50E is as √2 times long as the possible maximum value of the length l of the protector 50.

In the sixth embodiment, in a case where the protectors 50A to 50D according to the second to fifth embodiments and protectors 50F to 50J according to seventh to eleventh embodiments satisfy the relational expression indicated by Expression 9, the protector that satisfies Expression 9 may be used instead of the upper protector 50E. In such a case, the lower protector 51 may have the shape that corresponds to the upper protector in accordance with the substitution and may be arranged in the orientation and position in which the lower protector 51 overlaps with the upper protector when seen in the up-down direction. In a configuration that uses the lower protector 51, the maximum length l that satisfies Expression 9 is the "permissible maximum length lmax".

Seventh Embodiment

An RFID tag according to the seventh embodiment is different from the RFID tag 1 according to the first embodiment in a point that the protector 50 is substituted by the protector 50F. The other configurations may be the same, and descriptions thereof will not be made.

Figure 17:
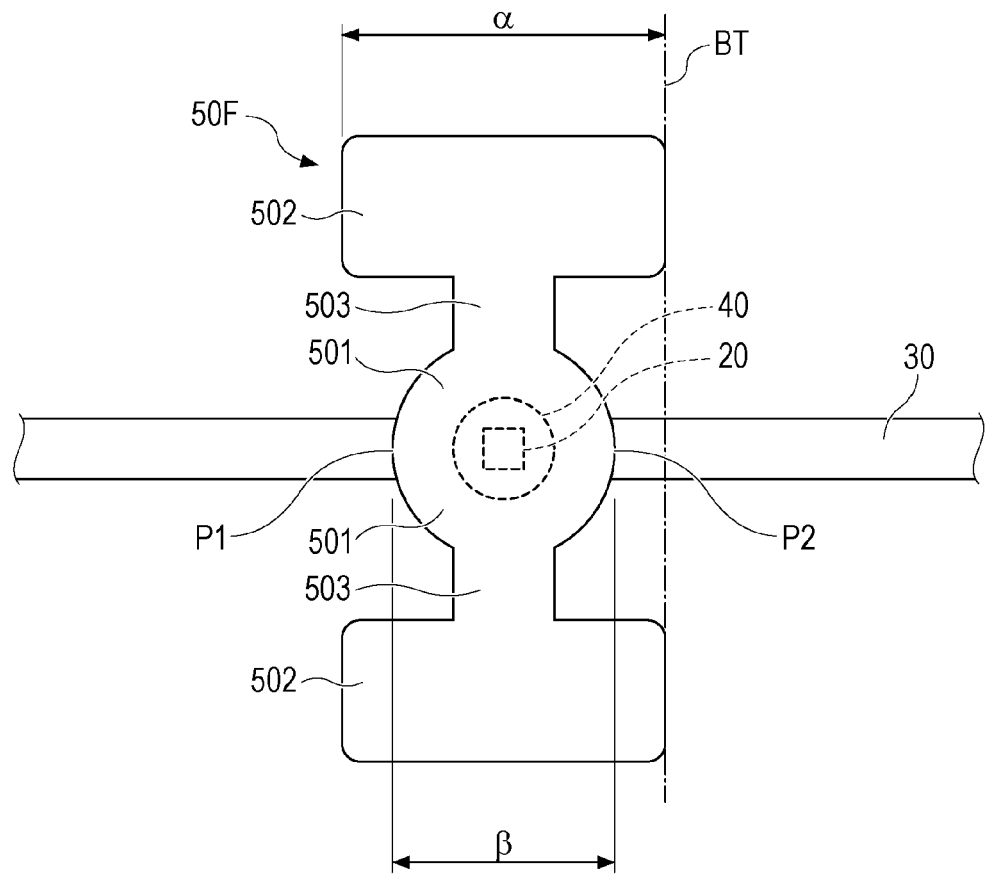
FIG. 17 is a top view that schematically illustrates a protector according to a seventh embodiment.

FIG. 17 is a top view that schematically illustrates the protector 50F according to the seventh embodiment and is a view that corresponds to section IV of FIG. 1.

As illustrated in FIG. 17, the protector 50F includes a central portion 501, end portions 502, and coupling portions 503. The central portion 501 covers the whole IC chip 20. Further, the central portion 501 preferably covers the IC chip 20 and the whole adhesive layer 40. In the example illustrated in FIG. 17, the central portion 501 has a circular form. The central portion 501 is provided on or above the antenna wiring 30. The antenna wiring 30 is provided across edge portions of the central portion 501 from each of the left and right sides with respect to the central portion 501. That is, the antenna wiring 30 extends, with respect to the central portion 501, from a left position P1 and a right position P2 toward a portion below the central portion 501 (further to a bump, which is not illustrated, of the IC chip 20). The direction for connecting the left position P1 and the right position P2 is the left-right direction and is perpendicular to the front-rear direction.

The protector 50F is provided with the end portions 502 and the coupling portions 503 with respect to the central portion 501 in a form in which the front-rear direction becomes the longitudinal direction. The end portions 502 are separated from the central portion 501 in the front-rear direction. The end portions 502 are formed so as not to contact with the antenna wiring 30. That is, the antenna wiring 30 does not pass through portions below the end portions 502. In the example illustrated in FIG. 17, the end portions 502 and the coupling portions 503 are provided on both of the sides of the central portion 501 in the front-rear direction. Each of the coupling portions 503 is provided between the corresponding end portion 502 and the central portion 501.

The end portions 502 of the protector 50F are formed such that a length $\alpha$ in the left-right direction becomes the permissible maximum length lmax or less. Further, the end portions 502 of the protector 50F are formed such that the length $\alpha$ in the left-right direction becomes greater than a length $\beta$ of the central portion 501 in the left-right direction. That is, the central portion 501 and the end portions 502 of the protector 50F are formed so as to satisfy $\beta < \alpha \le $ lmax.

The seventh embodiment may provide similar effects to the first embodiment. That is, because the central portion 501 of the protector 50F is formed such that the length of the diameter becomes the permissible maximum length lmax or less, bend due to plastic deformation is suppressed. Accordingly, the protection function (the protection function for the IC chip 20) of the protector 50F may be maintained under the usage environment. As a result, in the seventh embodiment, the RFID tag that includes the protector 50F may maintain high durability even under the above-described severe usage environment.

Further, in the seventh embodiment, because the lengths in the left-right direction of the central portion 501 and the end portions 502 of the protector 50F are the permissible maximum length lmax or less, bend due to plastic deformation is suppressed against a moment to bend the protector 50F along the front-rear direction. Accordingly, the substrate 10 bends along lines along edge positions in the left-right direction of the end portions 502 of the protector 50F (see a line BT in FIG. 17 and note that only the right line is illustrated) with respect to the moment to bend the protector 50F along the front-rear direction. Consequently, the possibility may be reduced that the antenna wiring 30 breaks by contacting with an edge portion of the protector 50F in a case where the substrate 10 bends and deforms. More specifically, in a comparative configuration in which the end portions 502 are not present, the substrate 10 bends along lines along edge positions in the left-right direction of the central portion 501 of the protector 50F with respect to the moment to bend the protector 50F along the front-rear direction. In such a case, it is possible that the antenna wiring 30 breaks by contacting with an edge portion of the central portion 501 of the protector 50F in a case where the substrate 10 bends and deforms. In this point, in the seventh embodiment, the protector 50F includes the end portions 502 with widths in the left-right direction greater than the central portion 501. Thus, the possibility may be reduced that the antenna wiring 30 breaks by contacting with the edge portion of the protector 50F in a case where the substrate 10 bends and deforms.

In the example illustrated in FIG. 17, although the coupling portions 503 are provided, the coupling portions 503 may be omitted unless edge portions in the left-right direction of the end portions 502 contact with the antenna wiring 30. Further, in the example illustrated in FIG. 17, the width of the coupling portion 503 in the left-right direction is less than the width of the central portion 501 but may be any value in a range from the width of the central portion 501 or more to the permissible maximum length lmax or less.

Further, in the example illustrated in FIG. 17, the direction for connecting the left position P1 and the right position P2 corresponds to the extending direction of the antenna wiring 30 and is in parallel with the left-right direction. However, embodiments are not limited thereto. For example, the direction for connecting the left position P1 and the right position P2 may be inclined with respect to the left-right direction unless the edge portions of the end portions 502 in the left-right direction contact with the antenna wiring 30.

Eighth Embodiment

An RFID tag according to the eighth embodiment is different from the RFID tag 1 according to the first embodiment in a point that the protector 50 is substituted by the protector 50G. The other configurations may be the same, and descriptions thereof will not be made.

Figure 18:
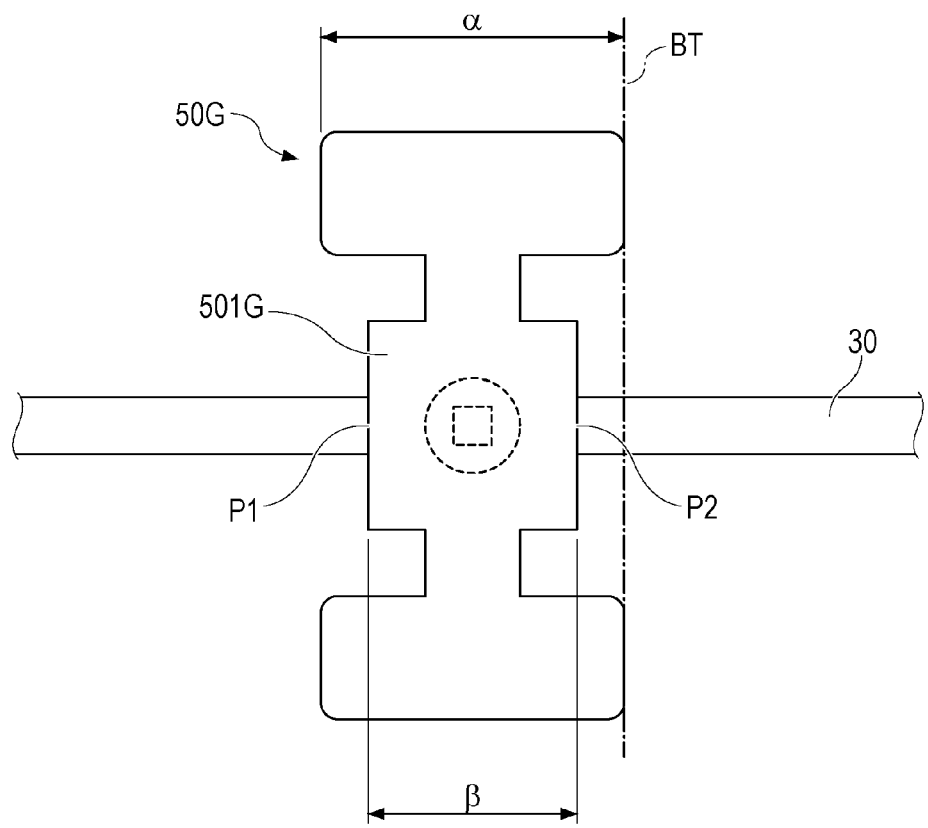
FIG. 18 is a top view that schematically illustrates a protector according to an eighth embodiment.

FIG. 18 is a top view that schematically illustrates the protector 50G according to the eighth embodiment and is a view that corresponds to section IV of FIG. 1.

The protector 50G is different from the protector 50F according to the seventh embodiment in a point that the central portion 501 is substituted by a central portion 501G. The central portion 501G has a different shape from the central portion 501 according to the seventh embodiment. Specifically, the central portion 501G has a rectangular form (including square and rectangles). The central portion 501G has a similar width $\beta$ to the central portion 501 according to the seventh embodiment.

The eighth embodiment may provide similar effects to the seventh embodiment.

Ninth Embodiment

An RFID tag according to the ninth embodiment is different from the RFID tag 1 according to the first embodiment in a point that the protector 50 is substituted by the protector 50H and the antenna wiring 30 is substituted by antenna wiring 30H. The other configurations may be the same, and descriptions thereof will not be made.

Figure 19:
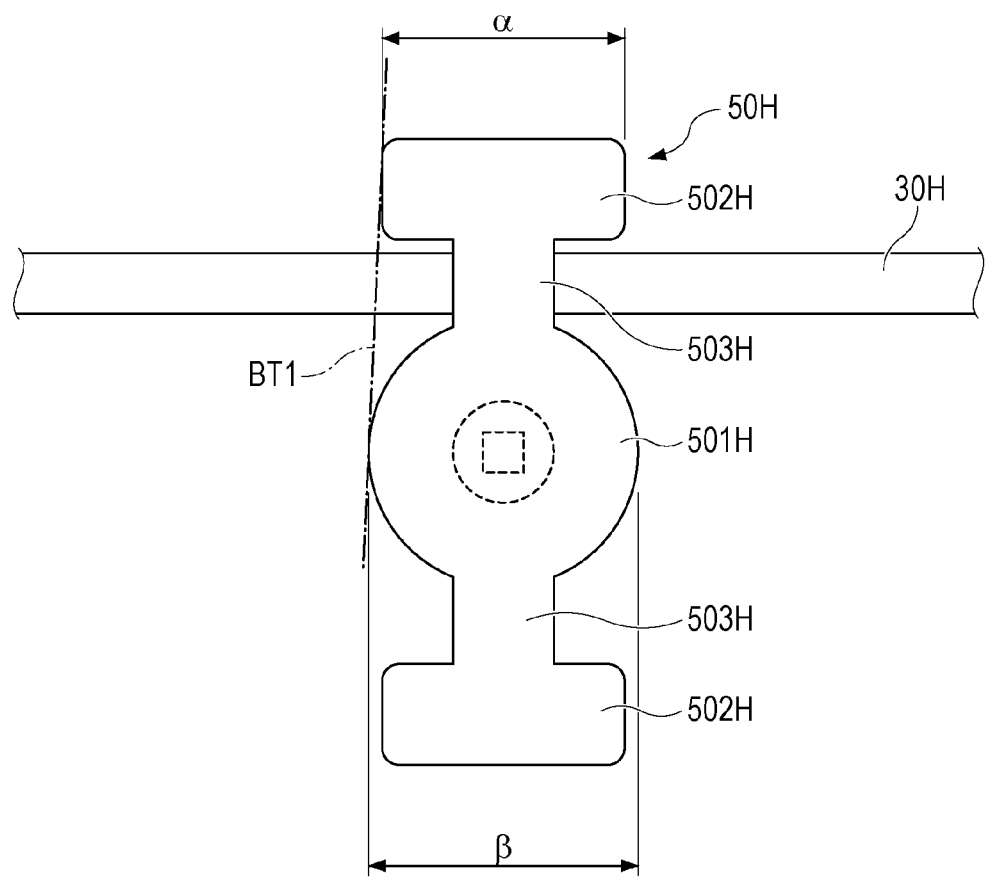
FIG. 19 is a top view that schematically illustrates a protector according to a ninth embodiment.

FIG. 19 is a top view that schematically illustrates the antenna wiring 30H and the protector 50H according to the ninth embodiment and is a view that corresponds to section IV of FIG. 1. The protector 50H is different from the protector 50F according to the seventh embodiment only in the dimensional relationship. A letter "F" in the ends of the reference characters of the components will be changed to a letter "H", and detailed descriptions of components will not be made.

As illustrated in FIG. 19, the antenna wiring 30H according to the ninth embodiment extends in the left-right direction in an end portion on the IC chip 20 side and in a position that is offset from the IC chip 20 in the front-rear direction. In the example illustrated in FIG. 19, the antenna wiring 30H passes through a coupling portion 503H of the protector 50H on a rear side in the end portion on the IC chip 20 side. That is, the coupling portion 503H of the protector 50H on the rear side is provided on or above the antenna wiring 30H. The antenna wiring 30H may be electrically coupled with the IC chip 20 while bending in the forward direction in a region below the coupling portion 503H on the rear side. Alternatively, the antenna wiring 30H may be wiring that forms a resonant circuit described later.

In the ninth embodiment, end portions 502H of the protector 50H are formed such that the length $\alpha$ in the left-right direction becomes the permissible maximum length lmax or less. Further, the end portions 502H of the protector 50H are formed such that the length $\alpha$ in the left-right direction becomes less than the length $\beta$ of the central portion 501H in the left-right direction. That is, the central portion 501H and the end portions 502H of the protector 50H are formed so as to satisfy $\alpha<\beta\leq lmax$.

The ninth embodiment may provide similar effects to the seventh embodiment. Specifically, because the lengths in the left-right direction of the central portion 501H and the end portions 502H of the protector 50H are the permissible maximum length lmax or less, bend due to plastic deformation is suppressed against a moment to bend the protector 50H along the front-rear direction. Accordingly, the substrate 10 bends along lines along edge portions in the left-right direction of the end portions 502H and edge portions of the central portion 501H in the left-right direction (see a line BT1 in FIG. 19 and note that only the left line is illustrated) with respect to the moment to bend the protector 50H along the front-rear direction. Consequently, the possibility may be reduced that the antenna wiring 30H breaks by contacting with edge portions of the coupling portions 503H of the protector 50H in a case where the substrate 10 bends and deforms.

Tenth Embodiment

An RFID tag according to the tenth embodiment is different from the RFID tag 1 according to the first embodiment in a point that the protector 50 is substituted by the protector 50I and the antenna wiring 30 is substituted by the antenna wiring 30H. The other configurations may be the same, and descriptions thereof will not be made.

Figure 20:
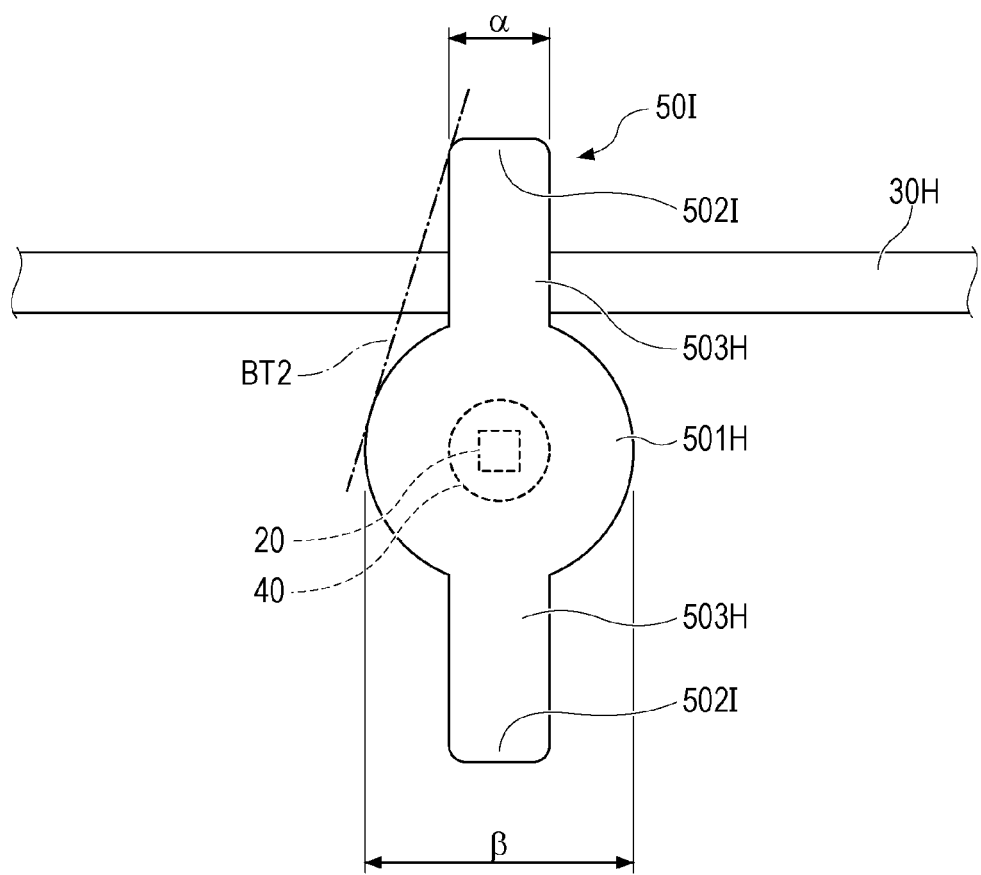
FIG. 20 is a top view that schematically illustrates a protector according to a tenth embodiment.

FIG. 20 is a top view that schematically illustrates the antenna wiring 30H and the protector 50I according to the tenth embodiment and is a view that corresponds to section IV of FIG. 1. The protector 50I is different from the protector 50H according to the ninth embodiment in a point that the end portions 502H are substituted by end portions 502I. The other components will be provided with the same reference characters, and detailed descriptions thereof will not be made.

As illustrated in FIG. 20, the antenna wiring 30H according to the tenth embodiment is as described in the ninth embodiment.

In the tenth embodiment, the end portions 502I of the protector 50I are formed such that the length $\alpha$ in the left-right direction becomes the permissible maximum length lmax or less. Further, the end portions 502I of the protector 50I are formed such that the length $\alpha$ in the left-right direction becomes less than the length $\beta$ of the central portion 501H in the left-right direction. That is, the central portion 501H and the end portions 502I of the protector 50I are formed so as to satisfy α<β≤lmax. Further, the length α of the end portion 502I in the left-right direction is the same as the length of the coupling portion 503H in the left-right direction.

The tenth embodiment may provide similar effects to the ninth embodiment. That is, because the lengths in the left-right direction of the central portion 501H and the end portions 502I of the protector 50I are the permissible maximum length lmax or less, bend due to plastic deformation is suppressed against a moment to bend the protector 50I along the front-rear direction. Accordingly, the substrate 10 bends along lines along edge portions of the end portions 502I in the left-right direction and the edge portions of the central portion 501H in the left-right direction (see a line BT2 in FIG. 20 and note that only the left line is illustrated) with respect to the moment to bend the protector 50I along the front-rear direction. Consequently, the possibility may be reduced that the antenna wiring 30H breaks by contacting with the edge portions of the coupling portions 503H of the protector 50I in a case where the substrate 10 bends and deforms.

Eleventh Embodiment

An RFID tag 1J according to the eleventh embodiment is different from the RFID tag 1 according to the first embodiment in a point that the protector 50 is substituted by the protector 50J and the antenna wiring 30 is substituted by the antenna wiring 30J. The other configurations may be the same, and descriptions thereof will not be made. The protector 503 is substantially the same as the protector 50F according to the seventh embodiment. The components will be provided with the same reference characters, and detailed descriptions thereof will not be made.

Figure 21:
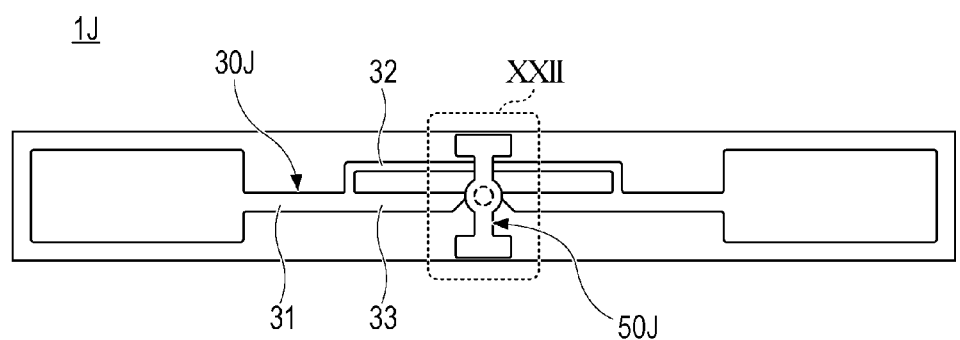
FIG. 21 is a top view that schematically illustrates an RFID tag according to an eleventh embodiment.
Figure 22:
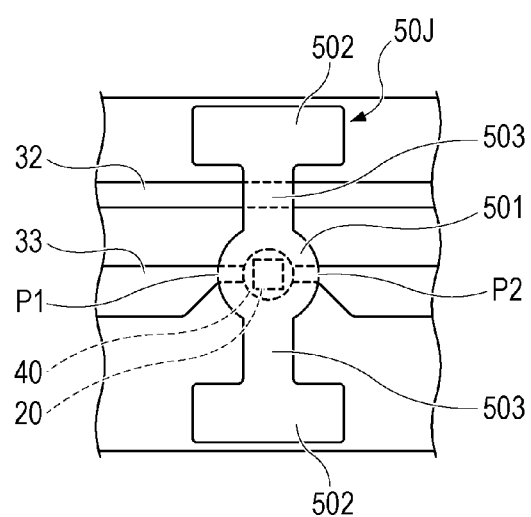
FIG. 22 is an enlarged top view of section XXII of FIG. 21.

FIG. 21 is a top view that schematically illustrates the RFID tag 13 according to the eleventh embodiment. FIG. 22 is an enlarged top view of section XXII of FIG. 21. FIG. 22 does not illustrate the protection layers 12 and the exterior portion 14. FIGS. 21 and 22 illustrate the RFID tag 13 by a transparent view so that internal portions may be seen.

The antenna wiring 303 is formed in a form of forming a dipole antenna, for example. The antenna wiring 303 is electrically coupled with the IC chip 20. The antenna wiring 303 is formed as a conductor pattern on the surface (upper surface) of the substrate 10. The antenna wiring 303 is substantially different from the antenna wiring 30 in a point that a wiring portion 32 which forms a resonant circuit is added. Specifically, the antenna wiring 303 includes wiring portions 31 and 33 that extend in the left-right direction and form the dipole antenna and the wiring portion 32 that forms the resonant circuit.

As illustrated in FIG. 22, the wiring portion 32 passes through the coupling portion 503 of the protector 503 on the rear side. That is, the coupling portion 503 of the protector 503 on the rear side is provided on the wiring portion 32 of the antenna wiring 303.

The wiring portion 33 is provided across edge portions of the central portion 501 from each of the left and right sides with respect to the central portion 501 of the protector 503. That is, the antenna wiring 30 extends, with respect to the central portion 501, from the left position P1 and the right position P2 toward a portion below the central portion 501 (further to the bump, which is not illustrated, of the IC chip 20). The direction for connecting the left position P1 and the right position P2 is the left-right direction and is perpendicular to the front-rear direction.

The eleventh embodiment may provide similar effects to the seventh embodiment and similar effects to the ninth embodiment. Specifically, because the lengths in the left-right direction of the central portion 501 and the end portions 502 of the protector 503 are the permissible maximum length lmax or less, bend due to plastic deformation is suppressed against a moment to bend the protector 503 along the front-rear direction. Consequently, the possibility may be reduced that the antenna wiring 303 breaks by contacting with edge portions of the protector 503 (the edge portions of the central portion 501 and the edge portions of the rear coupling portion 503) in a case where the substrate 10 bends and deforms.

In the foregoing, the embodiments have been described in detail. However, the techniques of the present disclosure are not limited to specific embodiments, but various modifications and alterations are possible within the scope of the claims. Further, it is possible to combine all or plural configuration elements of the above embodiments.

For example, in the above-described embodiments, the length l that satisfies Expression 5 (or Expression 9) is used as the length of the protector (for example, the protector 50) in the front-rear direction or the left-right direction. However, the length l may be the length of the diagonal line of the protector or the maximum length of the protector in any direction. For example, in a case of the protector 50B according to the third embodiment, in a case where the length l as the length of a diagonal line of the protector 50B satisfies Expression 5, a length l2 of one side of the protector 50B satisfies the following relational expression:

$$l2 \leq \sqrt{\frac{4\sigma_{by}}{6p}} h \tag{10}$$

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An RFID tag comprising:
   a substrate;
   a chip that is joined to the substrate;
   antenna wiring that is formed above the substrate and is electrically coupled with the chip; and
   a protector that is provided to the substrate and protects the chip by covering the chip, wherein
   a length l of the protector satisfies l≤lmax, the lmax being expressed by the following expression:

$$l_{max} = \sqrt{\frac{4\sigma_{by}}{3p}} h$$

where $\sigma_{by}$ represents a bending strength of a material of the protector, h represents a thickness of the protector, and p represents a uniformly distributed load that is received by the protector under a usage environment,
   wherein the protector includes a first portion that is provided above the antenna wiring and a second portion that is coupled with the first portion and is separated in a first direction from the antenna wiring, the length l of the protector is a length of the first portion along a second direction that is perpendicular to the first direction, and a length of the second portion along the second direction is longer than the length of the first portion along the second direction and is equal to or less than the lmax.

2. The RFID tag according to claim 1, wherein the length l of the protector is a length along a longitudinal direction of the substrate.

3. The RFID tag according to claim 1, wherein the length l of the protector is a length along a longitudinal direction of the chip.

4. The RFID tag according to claim 3, wherein the protector has a longitudinal direction and a widthwise direction, and the length l of the protector is a length along the widthwise direction of the protector.

5. The RFID tag according to claim 3, wherein the protector is an ellipse or a rectangle, and the protector and the chip are arranged in a relationship in which the longitudinal directions of the protector and the chip are orthogonal to each other.

6. The RFID tag according to claim 1, wherein the antenna wiring is provided across edge portions of the first portion from each side in the second direction.

7. The RFID tag according to claim 6, wherein the first direction is a longitudinal direction of the protector.

8. The RFID tag according to claim 1, wherein the protector further includes a coupling portion that couples the first portion and the second portion together, the first portion covers the chip, and a length of the coupling portion along the second direction is less than the length of the first portion along the second direction.

9. The RFID tag according to claim 1, wherein the uniformly distributed load p is in a range of $50 \times 10^5$ to $60 \times 10^5$ Pa.

10. The RFID tag according to claim 1, wherein the first portion is a circle, a square, an ellipse, or a rectangle.

11. An RFID tag comprising:
a substrate;
a chip that is joined to the substrate;
antenna wiring that is formed above the substrate and is electrically coupled with the chip; and
a protector that is provided to the substrate and protects the chip by covering the chip, wherein
a length l of the protector satisfies l≤lmax, the lmax being expressed by the following expression:

$$l_{max} = \sqrt{\frac{4\sigma_{by}}{3p}} h$$

where $\sigma_{by}$ represents a bending strength of a material of the protector, h represents a thickness of the protector, and p represents a uniformly distributed load that is received by the protector under a usage environment, wherein the protector includes a first portion that covers the chip and a coupling portion that is coupled with the first portion in a first direction and is provided above the antenna wiring, the length l of the protector is a length of the first portion along a second direction that is perpendicular to the first direction, and a length of the coupling portion along the second direction is less than the length of the first portion along the second direction.

12. The RFID tag according to claim 11, wherein the protector further includes a second portion that is coupled with the coupling portion in the first direction.

13. The RFID tag according to claim 1, wherein the uniformly distributed load p is in a range of $40 \times 10^5$ to $70 \times 10^5$ Pa.

14. An RFID tag comprising:
a substrate;
a chip that is joined to a first side of the substrate;
antenna wiring that is formed above the substrate and is electrically coupled with the chip;
a protector that is provided to the first side of the substrate and protects the chip by covering the chip; and
a second protector that is provided to a second side on an opposite side from the first side of the substrate and is opposed to the protector, wherein a length l of the protector satisfies l≤lmax, the lmax being expressed by the following expression:

$$l_{max} = \sqrt{\frac{8\sigma_{by}}{3p}} h$$

where $\sigma_{by}$ represents a bending strength of a material of the protector, h represents a thickness of the protector, and p represents a uniformly distributed load that is received by the protector under a usage environment, wherein the protector includes a first portion that is provided above the antenna wiring and a second portion that is coupled with the first portion and is separated in a first direction from the antenna wiring, the length l of the protector is a length of the first portion along a second direction that is perpendicular to the first direction, and a length of the second portion along the second direction is longer than the length of the first portion along the second direction and is equal to or less than the lmax.

15. The RFID tag according to claim 14, wherein the length l of the protector is a length along a longitudinal direction of the substrate.

16. The RFID tag according to claim 14, wherein the length l of the protector is a length along a longitudinal direction of the chip.

17. The RFID tag according to claim 16, wherein the protector has a longitudinal direction and a widthwise direction, and the length l of the protector is a length along the widthwise direction of the protector.

18. The RFID tag according to claim 14, wherein the second protector has a same section modulus as the protector.

19. The RFID tag according to claim 14, wherein the second protector has a same shape as the protector.

* * * * *